(12) United States Patent  
Kasamatsu et al.

(10) Patent No.: US 12,546,885 B2  
(45) Date of Patent: Feb. 10, 2026

(54) IMAGING SYSTEM, IMAGING METHOD, IMAGING PROGRAM, AND INFORMATION ACQUISITION METHOD

(71) Applicant: FUJIFILM Corporation, Tokyo (JP)

(72) Inventors: Tadashi Kasamatsu, Kanagawa (JP); Shinichiro Sonoda, Kanagawa (JP); Makoto Yonaha, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 529 days.

(21) Appl. No.: 18/050,709

(22) Filed: Oct. 28, 2022

(65) Prior Publication Data

US 2023/0105955 A1 Apr. 6, 2023

Related U.S. Application Data

(63) Continuation of application No. PCT/JP2021/019700, filed on May 25, 2021.

(30) Foreign Application Priority Data

May 29, 2020 (JP) ................................. 2020-094325

(51) Int. Cl.
G01S 13/89 (2006.01)
G01N 22/02 (2006.01)
(Continued)

(52) U.S. Cl.
CPC ............. G01S 13/89 (2013.01); G01N 22/02 (2013.01); G01S 13/08 (2013.01); G01S 17/89 (2013.01);
(Continued)

(58) Field of Classification Search
CPC .......... G01S 13/89; G01S 13/08; G01S 17/89; G01S 13/865; G01S 13/867; G01S 17/08;
(Continued)

(56) References Cited

U.S. PATENT DOCUMENTS 10,746,625 B2 * 8/2020 Santra ................. G01M 5/0008
2003/0179084 A1 * 9/2003 Skrbina ................ G01S 13/867
340/522
(Continued)

FOREIGN PATENT DOCUMENTS

CN 101950436 A 1/2011
CN 102095755 A 6/2011
(Continued)

OTHER PUBLICATIONS

U.S. Notice of Allowance for U.S. Appl. No. 18/050,833, dated Nov. 25, 2024.
(Continued)

Primary Examiner — Vladimir Magloire
Assistant Examiner — Yonghong Li
(74) Attorney, Agent, or Firm — Birch, Stewart, Kolasch & Birch, LLP

(57) ABSTRACT

An imaging system includes a visible-light image capturing device that images an object with light including visible light to acquire a visible-light image, a millimeter-wave image capturing device that images the object with an electromagnetic wave in a millimeter-wave band to acquire a millimeter-wave image, a distance measurement device that measures an imaging distance to the object, a memory in which information indicating end points and/or edges of the millimeter-wave image in the visible-light image is stored in correspondence with the imaging distance; and a processor. The processor acquires information in correspondence with the imaging distance by referring to the memory and generates a superimposed image in which the visible-light image and the millimeter-wave image are superimposed based on the acquired information.

15 Claims, 15 Drawing Sheets

(51) Int. Cl.
  *G01S 13/08* (2006.01)
  *G01S 17/89* (2020.01)
  *G06T 5/50* (2006.01)
(52) U.S. Cl.
  CPC ...... *G06T 5/50* (2013.01); *G06T 2207/20221* (2013.01)
(58) Field of Classification Search
  CPC ...... G01S 17/86; G01S 17/894; G01S 17/933; G01S 17/931; G01N 22/02; G01N 21/88; G06T 5/50; G06T 2207/20221; G06T 19/00
  See application file for complete search history.

(56) References Cited

U.S. PATENT DOCUMENTS

| | | | |
|---|---|---|---|
| 2005/0110672 | A1 | 5/2005 | Cardiasmenos et al. |
| 2008/0195330 | A1 | 8/2008 | Hara et al. |
| 2011/0181881 | A1 | 7/2011 | Mathur et al. |
| 2013/0176424 | A1* | 7/2013 | Weil .................. H04N 7/181 348/128 |
| 2013/0250070 | A1 | 9/2013 | Takayama |
| 2017/0307746 | A1* | 10/2017 | Rohani ................ G01S 13/865 |
| 2019/0003830 | A1 | 1/2019 | Irie |
| 2020/0018854 | A1* | 1/2020 | Hicks .................. G01S 7/4802 |
| 2020/0025877 | A1* | 1/2020 | Sarkis .................. G01S 7/412 |
| 2021/0209422 | A1 | 7/2021 | Horita |
| 2021/0405182 | A1 | 12/2021 | Reynolds et al. |

FOREIGN PATENT DOCUMENTS

| | | | |
|---|---|---|---|
| CN | 101614814 | B | 2/2012 |
| CN | 105068065 | A | 11/2015 |
| JP | 7-151719 | A | 6/1995 |
| JP | 11-83754 | A | 3/1999 |
| JP | 11-83996 | A | 3/1999 |
| JP | 11-259656 | A | 9/1999 |
| JP | 2000-193611 | A | 7/2000 |
| JP | 2002-257744 | A | 9/2002 |
| JP | 2002-350365 | A | 12/2002 |
| JP | 2004-212104 | A | 7/2004 |
| JP | 2004-325246 | A | 11/2004 |
| JP | 2005-16995 | A | 1/2005 |
| JP | 2005-37388 | A | 2/2005 |
| JP | 2006-108473 | A1 | 4/2006 |
| JP | 2006-132973 | A | 5/2006 |
| JP | 2007-121214 | A | 5/2007 |
| JP | 2007-178384 | A | 7/2007 |
| JP | 2007-183227 | A | 7/2007 |
| JP | 2008-145298 | A | 6/2008 |
| JP | 2008-151809 | A | 7/2008 |
| JP | 2008-203123 | A | 9/2008 |
| JP | 2011-39690 | A | 2/2011 |
| JP | 2011-133322 | A | 7/2011 |
| JP | 2012-202859 | A | 10/2012 |
| JP | 2013-250059 | A | 12/2013 |
| JP | 2014-6222 | A | 1/2014 |
| JP | 2015-219014 | A | 12/2015 |
| JP | 2016-6398 | A | 1/2016 |
| JP | 2016-111414 | A | 6/2016 |
| JP | 2017-138239 | A | 8/2017 |
| JP | 2018-54319 | A | 4/2018 |
| JP | 2018-185228 | A | 11/2018 |
| JP | 2019-27908 | A | 2/2019 |
| JP | 2019-39849 | A | 3/2019 |
| JP | 2019-70627 | A | 5/2019 |
| JP | 2019-130927 | A | 8/2019 |
| JP | 2019-144191 | A | 8/2019 |
| JP | 2019-158793 | A | 9/2019 |
| JP | 2020-16667 | A | 1/2020 |
| JP | 2020-24184 | A | 2/2020 |
| JP | 2020-504811 | A | 2/2020 |
| JP | 2020-51851 | A | 4/2020 |
| JP | 2020-63969 | A | 4/2020 |
| JP | 2020-71863 | A | 5/2020 |
| KR | 10-1492336 | B1 | 2/2015 |
| WO | WO 2012/073722 | A1 | 6/2012 |
| WO | WO 2017/119154 | A1 | 7/2017 |
| WO | WO 2017/154731 | A1 | 9/2017 |
| WO | WO 2018/037689 | A1 | 3/2018 |
| WO | WO 2020/059706 | A1 | 3/2020 |

OTHER PUBLICATIONS

Japanese Office Action for Japanese Application No. 2022-526555, dated Dec. 12, 2023, with English translation.
International Preliminary Report on Patentability and English translation of the Written Opinion of the International Searching Authority for International Application No. PCT/JP2021/019704, dated Dec. 8, 2022.
International Preliminary Report on Patentability and Written Opinion of the International Searching Authority dated Mar. 4, 2022 for Application No. PCT/JP2021/019703 with an English translation.
International Preliminary Report on Patentability and Written Opinion of the International Searching Authority for International Application No. PCT/JP2021/019702, dated Apr. 8, 2022, with an English translation.
International Preliminary Report on Patentability and Written Opinion of the International Searching Authority for International Application No. PCT/JP2021/019701, dated Jan. 28, 2022, with an English translation.
International Search Report for International Application No. PCT/JP2021/019702, dated Aug. 17, 2021, with English translation.
International Search Report for International Application No. PCT/JP2021/019704, dated Aug. 3, 2021, with English translation.
International Search Report dated Aug. 17, 2021 for Application No. PCT/JP2021/019703 with an English translation.
International Search Report for International Application No. PCT/JP2021/019701, dated Aug. 17, 2021, with English translation.
Japanese Office Action for Japanese Application No. 2022-526554, dated Jan. 24, 2024, with English translation.
International Preliminary Report on Patentability and Written Opinion of the International Searching Authority dated Jan. 28, 2022 for Application No. PCT/JP2021/019700 with an English translation.
International Search Report dated Aug. 17, 2021 for Application No. PCT/JP2021/019700 with an English translation.

* cited by examiner

| IMAGING DISTANCE | COORDINATES (X,Y) OF END POINT | | | |
|---|---|---|---|---|
| | END POINT A | END POINT B | END POINT C | END POINT D |
| d1 | $(X1_A, Y1_A)$ | $(X1_B, Y1_B)$ | $(X1_C, Y1_C)$ | $(X1_D, Y1_D)$ |
| d2 | $(X2_A, Y2_A)$ | $(X2_B, Y2_B)$ | $(X2_C, Y2_C)$ | $(X2_D, Y2_D)$ |
| d3 | $(X3_A, Y3_A)$ | $(X3_B, Y3_B)$ | $(X3_C, Y3_C)$ | $(X3_D, Y3_D)$ |
| d4 | $(X4_A, Y4_A)$ | $(X4_B, Y4_B)$ | $(X4_C, Y4_C)$ | $(X4_D, Y4_D)$ |
| ⋮ | ⋮ | ⋮ | ⋮ | ⋮ |

IMAGING SYSTEM, IMAGING METHOD, IMAGING PROGRAM, AND INFORMATION ACQUISITION METHOD

CROSS-REFERENCE TO RELATED APPLICATIONS

The present application is a Continuation of PCT International Application No. PCT/JP2021/019700 filed on May 25, 2021 claiming priority under 35 U.S.C. § 119(a) to Japanese Patent Application No. 2020-094325 filed on May 29, 2020. Each of the above applications is hereby expressly incorporated by reference, in its entirety, into the present application.

BACKGROUND OF THE INVENTION

1. Field of the Invention

The present invention relates to a technique for imaging an object with visible light and a millimeter wave.

2. Description of the Related Art

For example, an imaging system using an electromagnetic wave in a millimeter-wave band is described in JP2007-183227A. In this imaging system, a degree of unevenness on a surface of a structure is analyzed from an image captured with visible light, and a deteriorated place of the structure is seen through by the electromagnetic wave in the millimeter-wave band with a wavelength corresponding to the degree of unevenness obtained from the analysis.

SUMMARY OF THE INVENTION

An image captured with visible light (visible-light image) can be used to observe a structure surface, and an image captured with a millimeter wave (millimeter-wave image) can be used to observe a surface and inside of a structure. In a case where these two types of images are used, it is preferable to grasp a positional relationship between the two images such that the same region can be observed at a plurality of wavelengths. However, the technique described in JP2007-183227A does not take into consideration such a circumstance.

The present invention has been made in view of such circumstances, and provides an imaging system, an imaging method, an imaging program, and an information acquisition method capable of grasping a positional relationship between a visible-light image and a millimeter-wave image.

An imaging system according to a first aspect of the present invention comprises a visible-light image capturing device that images an object with light including visible light to acquire a visible-light image, a millimeter-wave image capturing device that images the object with an electromagnetic wave in a millimeter-wave band to acquire a millimeter-wave image, a distance measurement device that measures an imaging distance to the object, a memory in which information indicating end points and/or edges of the millimeter-wave image in the visible-light image is stored in correspondence with the imaging distance, and a processor. The processor acquires the information in correspondence with the imaging distance by referring to the memory and generates a superimposed image in which the visible-light image and the millimeter-wave image are superimposed based on the acquired information.

In the imaging system according to a second aspect, in the first aspect, the processor causes a display device to display the superimposed image.

In the imaging system according to a third aspect, in the second aspect, the processor causes the display device to display the information.

In the imaging system according to a fourth aspect, in any one of the first to third aspects, the processor interpolates or extrapolates the information stored in the memory to acquire the information in correspondence with the imaging distance.

The imaging system according to a fifth aspect, in any one of the first to fourth aspects, further comprises a laser head that emits laser light to the object. The processor causes the laser head to emit the laser light to the object.

In the imaging system according to a sixth aspect, in any one of the first to fifth aspects, the processor causes the laser head to emit laser light indicating the end points and/or edges based on the stored information.

In the imaging system according to a seventh aspect, in the fifth or sixth aspect, the visible-light image capturing device performs focus control on the object to which the laser light is emitted to capture the visible-light image.

In the imaging system according to an eighth aspect, in any one of the first to seventh aspects, the distance measurement device is a millimeter-wave radar, a laser distance measurement device, or a laser triangulation device.

In the imaging system according to a ninth aspect, in any one of the first to eighth aspects, the millimeter-wave image capturing device senses an inside of the object.

In the imaging system according to a tenth aspect, in any one of the first to ninth aspects, the millimeter-wave image capturing device senses a damage existing inside the object.

In the imaging system according to an eleventh aspect, in any one of the first to tenth aspects, the visible-light image capturing device, the millimeter-wave image capturing device, and the distance measurement device are mounted on a moving object.

In the imaging system according to a twelfth aspect, in the eleventh aspect, the moving object is a vehicle or a flying object.

In the imaging system according to a thirteenth aspect, in any one of the first to twelfth aspects, the object is a social infrastructure structure.

An imaging method according to a fourteenth aspect comprises a visible-light image capturing step of imaging an object with light including visible light to acquire a visible-light image, a millimeter-wave image capturing step of imaging the object with an electromagnetic wave in a millimeter-wave band to acquire a millimeter-wave image, a distance measurement step of measuring an imaging distance to the object, an information acquiring step of referring to a memory in which information indicating end points and/or edges of the millimeter-wave image in the visible-light image is stored in correspondence with the imaging distance to acquire the information in correspondence with the imaging distance, and an image generation step of generating a superimposed image in which the visible-light image and the millimeter-wave image are superimposed based on the acquired information. The imaging method according to the fourteenth aspect may comprise the same configuration as the second to thirteenth aspects.

An imaging program according to a fifteenth aspect of the present invention causes a computer to execute the imaging method according to the fourteenth aspect. A non-transitory recording medium in which a computer-readable code of the imaging program according to the fifteenth aspect is recorded can also be mentioned as an aspect of the present invention.

An information acquisition method according to a sixteenth aspect uses a visible-light image capturing device that images an object with light including visible light to acquire a visible-light image and a millimeter-wave image capturing device that images an object with an electromagnetic wave in a millimeter-wave band to acquire a millimeter-wave image. The information acquisition method comprises a visible-light image capturing step of imaging a millimeter-wave reflector as the object with the visible-light image capturing device to acquire the visible-light image for a plurality of imaging distances, a millimeter-wave image capturing step of imaging the millimeter-wave reflector with the millimeter-wave image capturing device to acquire the millimeter-wave image for the plurality of imaging distances, an information generation step of generating information indicating end points and/or edges of the millimeter-wave image in the visible-light image for each of the plurality of imaging distances, based on the visible-light image and the millimeter-wave image, and an information storing step of storing the information in association with the imaging distance in a memory.

The information acquisition method according to a seventeenth aspect, in the sixteenth aspect, in the visible-light image capturing step and the millimeter-wave image capturing step, the visible-light image and the millimeter-wave image are acquired while relatively moving the visible-light image capturing device, the millimeter-wave image capturing device, and the millimeter-wave reflector in a state where the imaging distance is constantly maintained.

The information acquisition method according to an eighteenth aspect, in the sixteenth or seventeenth aspect, in the visible-light image capturing step and the millimeter-wave image capturing step, a millimeter-wave reflector having a millimeter-wave reflectance according to a millimeter-wave reflectance of an object to be imaged is used as the millimeter-wave reflector to acquire the visible-light image and the millimeter-wave image. In the information generation step, the information is generated in correspondence with the millimeter-wave reflectance of the millimeter-wave reflector. In the information storing step, the information is stored in the memory in association with the imaging distance and the millimeter-wave reflectance.

The information acquisition program causing the computer to execute the information acquisition method according to any one of the sixteenth to eighteenth aspects and the non-transitory recording medium in which the computer-readable code of the program is recorded are also aspects of the present invention.

With the imaging system, imaging method, imaging program, and information acquisition method according to the present invention, it is possible to grasp the positional relationship between the visible-light image and the millimeter-wave image.

DESCRIPTION OF THE PREFERRED EMBODIMENTS

One embodiment of an imaging system, imaging method, imaging program, and information acquisition method of the present invention is as follows. In the description, accompanying drawings will be referred to as necessary.

First Embodiment

[Configuration of Imaging System]

Figure 1:
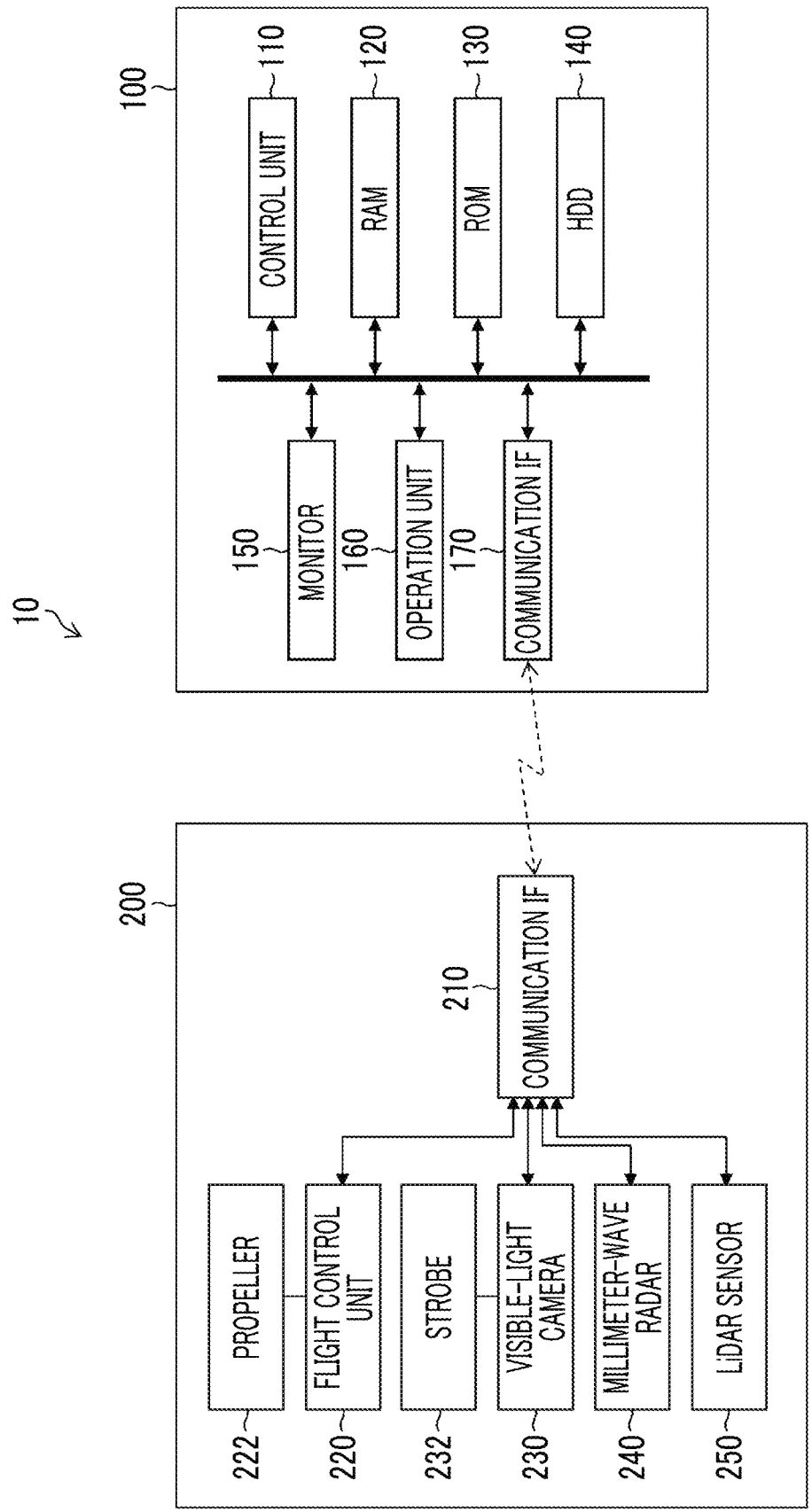
FIG. 1 is a diagram showing a schematic configuration of an imaging system according to a first embodiment.

FIG. 1 is a diagram showing a schematic configuration of an imaging system 10 (imaging system) according to a first embodiment. The imaging system 10 comprises a control device 100 (visible-light image capturing device, millimeter-wave image capturing device, distance measurement device, memory, processor, computer, and display device) and a drone 200 (visible-light image capturing device, millimeter-wave image capturing device, distance measurement device, moving object, and flying object). Wireless communication is performed between the control device 100 and the drone 200.

[Configuration of Control Device]

The control device 100 comprises a control unit 110 (processor), a random access memory 120 (RAM), a read only memory 130 (ROM), a hard disk drive 140 (HDD, memory, or non-transitory recording medium), a monitor 150 (display device), an operation unit 160, and a communication interface 170 (IF).

The control unit 110 performs processing of the information acquisition method and imaging method according to the present invention in accordance with programs and data stored in the ROM 130 and the HDD 140. During the processing, the RAM 120 is used as a temporary storage region. The HDD 140 stores computer-readable codes of the programs for executing the information acquisition method and imaging method according to the present invention and data such as an acquired image and an imaging distance. Further, the HDD 140 stores in advance information indicating end points and/or edges of a millimeter-wave image in a visible-light image (hereinafter sometimes referred to as "end point information" for the sake of convenience) in correspondence with the imaging distance. These pieces of data and processing results can be displayed on the monitor 150 such as a liquid crystal display. Instead of the hard disk drive, the non-transitory storage medium such as various magneto-optical disks or a semiconductor memory may be used. The operation unit 160 comprises devices such as a mouse and a keyboard (not shown), and a user can issue instructions such as execution of the information acquisition method and the imaging method and display of the result via these devices. A device with a touch panel may be used as the monitor 150 and receive the user instruction via the touch panel. In a case where the information acquisition method and the imaging method are executed, the wireless communication is performed with the drone 200 via the communication IF 170. The communication IF 170 comprises an antenna for wireless communication (not shown).

Figure 2:
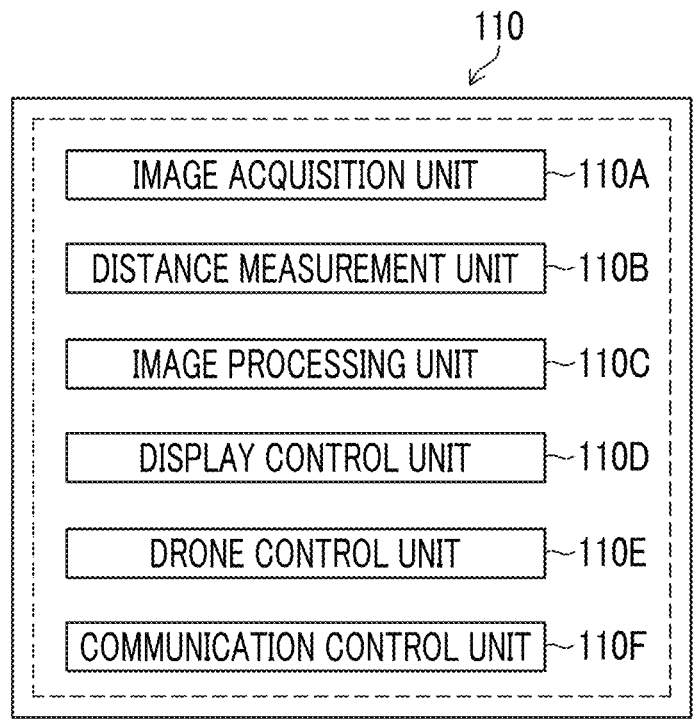
FIG. 2 is a diagram showing a functional configuration of a control unit.

FIG. 2 is a diagram showing a functional configuration of the control unit 110. An image acquisition unit 110A controls a visible-light camera 230 and a millimeter-wave radar 240 (refer to FIG. 1), which will be described below, to acquire the visible-light image and the millimeter-wave image. A distance measurement unit 110B calculates the imaging distance based on a measurement result of a LiDAR sensor 250. An image processing unit 110C detects (senses) a damage such as a crack or a float from the acquired visible-light image and millimeter-wave image, and generates a superimposed image in which the visible-light image and the millimeter-wave image are superimposed. A display control unit 110D causes the monitor 150 to display the acquired and/or generated image, a damage extraction result, and the like. A drone control unit 110E causes the drone 200 to fly according to a determined flight plan. A communication control unit 110F performs the wireless communication with the drone 200 via the communication IF 170 to transmit and receive the instruction from the control device 100, an image acquired by the drone 200, and the like.

The functions of the control unit 110 described above can be realized by using various processors and recording media. Various processors include, for example, a central processing unit (CPU) that is a general-purpose processor that executes software (programs) to realize various functions, a graphics processing unit (GPU) that is a processor specialized for image processing, and a programmable logic device (PLD) that is processor whose circuit configuration can be changed after manufacture such as a field programmable gate array (FPGA). Each function may be realized by one processor, or a plurality of processors of the same type or different types (for example, a plurality of FPGAs, a combination of CPU and FPGA, or a combination of CPU and GPU). A plurality of functions may be realized by one processor. A hardware structure of the various processors is, more specifically, circuitry in which circuit elements such as semiconductor elements are combined.

In a case where the processor or circuitry described above executes the software (program), a code that can be read by a computer (for example, various processors or circuitry constituting the control unit 110, and/or combination thereof) of the software to be executed is stored in the non-transitory storage medium (memory) such as the ROM 130 or HDD 140, and the computer refers to the software. During the execution, the information stored in the storage device is used as necessary. Further, during the execution, for example, the RAM 120 (memory) is used as a temporary storage region.

The control device 100 can be realized by installing an information acquisition program and imaging program according to the present invention in a device (computer) such as a personal computer, a smartphone, or a tablet terminal. In the imaging system of the present invention, "memory in which information indicating end point and/or edge of millimeter-wave image (end point information) is stored in correspondence with imaging distance" may be a medium in which information is stored in advance before the imaging (inspection) such as the HDD 140 or a medium in which information is temporarily read in executing the imaging method such as the RAM 120.

The configuration and functions of the control device 100 may be realized by a computer or the like on the cloud. For example, the control device 100 may transmit/receive images and data to/from a network, display results, and the like, and the computer on the cloud may perform damage detection, image superimposition, and the like. In such an aspect, the imaging system of the present invention is configured including the computer on the cloud.

[Drone Configuration]

Returning to FIG. 1, a configuration of the drone 200 (moving object, flying object) will be described. The drone 200 comprises a plurality of propellers 222 and flies by the propellers 222 being controlled by a flight control unit 220. The drone 200 is mounted with the visible-light camera 230 (visible-light camera, visible-light image capturing device) that acquires the visible-light image, the millimeter-wave radar 240 (millimeter-wave radar, millimeter-wave image capturing device) that captures the millimeter-wave image, and the light detection and ranging sensor 250 (LiDAR, distance measurement device, laser distance measurement device) that measures the imaging distance to an object. The communication between the drone 200 and the control device 100 is performed via a communication interface 210 (IF). The communication IF 210 comprises an antenna for wireless communication (not shown).

The visible-light camera 230 comprises a zoom lens, a focus lens, and an imaging element (not shown). A mechanical shutter or an electronic shutter, and a stop may be provided. Various photoelectric conversion elements such as a complementary metal-oxide semiconductor (CMOS) and a charge-coupled device (CCD) can be used as the imaging element of the visible-light camera 230, and pixels for focus control (for example, pixels used for focus control of image plane phase difference method) may be arranged in a predetermined direction of the imaging element. The imaging element may be a color image pickup element in which a color filter of R (red), G (green), or B (blue) is provided and a color image of a subject can be acquired based on a signal of each color. In a CMOS imaging element, an analog front end (AFE), an A/D converter, and a digital signal processing unit may be built into a chip. In a case where the imaging with the visible-light camera 230 is performed, a strobe 232 is used as necessary.

The millimeter-wave radar 240 is a device that emits an electromagnetic wave in the millimeter-wave band (30 GHz to 300 GHz) to the object to sense a surface and inside of the object (depending on conditions such as object type and radar wavelength and output). A method in which a reflected wave of a millimeter wave emitted by a millimeter-wave transmitter and a transmission antenna is received by a reception antenna and a detector can be used. Further, a technique (multiple-input-multiple-output: MIMO) that can generate more virtual reception antennas than the number of installed reception antennas by transmitting signals from a plurality of antennas may be used. As the millimeter wave, for example, radio waves in 60 GHz band, 76 GHz band, and 79 GHz band can be used. The "millimeter-wave radar" is synonymous with a millimeter-wave camera and a millimeter-wave scanner.

The LiDAR sensor 250 emits laser light to the object and observes scattering and reflected light of the laser light to acquire data for measuring a distance to the object and specifying the property of the object. The distance measurement unit 110B of the control device 100 can calculate the imaging distance from this data, but the LiDAR sensor 250 may have the function of distance measurement (calculation).

[Imaging of Social Infrastructure Structure and Like]

Figure 3:
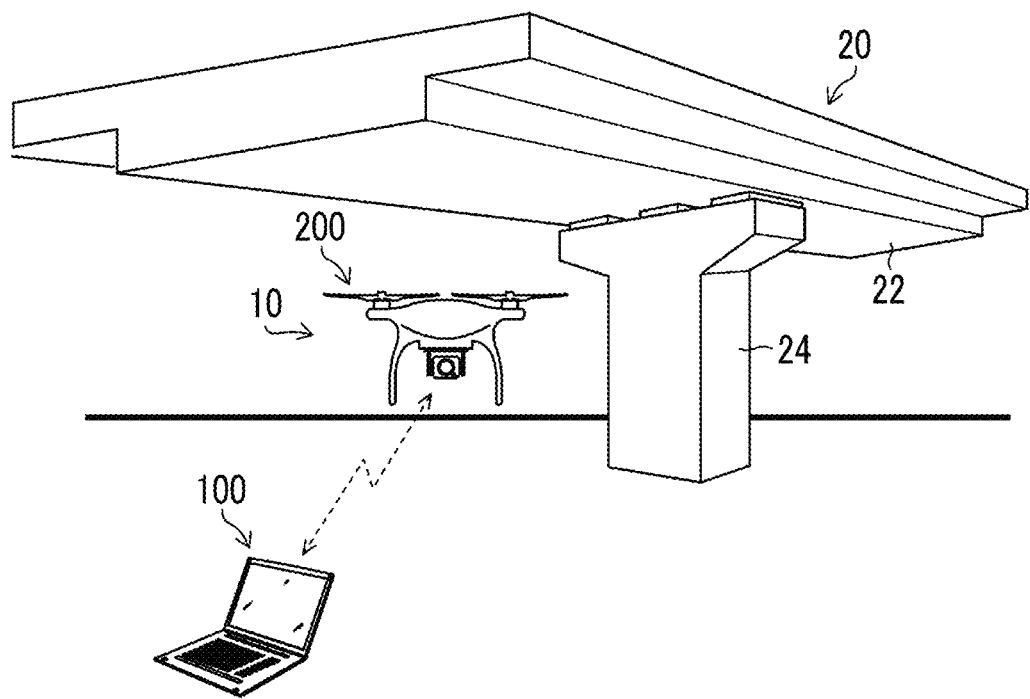
FIG. 3 is a diagram showing a state where a bridge is imaged (inspected) by using the imaging system.

FIG. 3 is a diagram showing a state where a bridge 20 (object, social infrastructure structure) is imaged (inspected) by using the imaging system 10. The social infrastructure structure, such as a bridge, requires regular inspections for the presence and degree of damages (crack, float, delamination, exposed reinforcing bar, water leakage, and the like). However, a great deal of time and effort is often required for the inspection since the structure is long and large. In recent years, there has been a demand for techniques for efficient inspection. The "social infrastructure structure" may be referred to as "social structure" or the like, and examples of the "social infrastructure structure" include a road, an embankment, a dam, a tunnel, a pipeline, and a building. The social infrastructure structure may be a concrete structure or a metal structure. In the example of FIG. 3, the drone 200 can image, for example, a floorboard 22 and a bridge pier 24 to acquire the visible-light image and the millimeter-wave image, and the damage can be detected based on the acquired images.

The subject of application of the imaging system and the like of the present invention is not limited to the social infrastructure structure, but can also be applied to grasping a growing condition and measuring moisture content of an agricultural product, detecting obstacles in a vehicle and an airplane, and the like.

[Processing of Information Acquisition Method]

In the imaging system 10, before the imaging for inspection, the information (end point information) indicating the end points and/or edges of the millimeter-wave image in the visible-light image is acquired by the information acquisition method according to the present invention and stored in a storage device (memory) such as the HDD 140 in correspondence with the imaging distance. Specifically, as described below, the visible-light image and the millimeter-wave image are acquired while moving a millimeter-wave reflector as the object relatively to the drone 200 (visible-light camera 230, millimeter-wave radar 240) (visible-light image capturing step, millimeter-wave image capturing step), and the information is generated from these images (information generation step).

Figure 4:
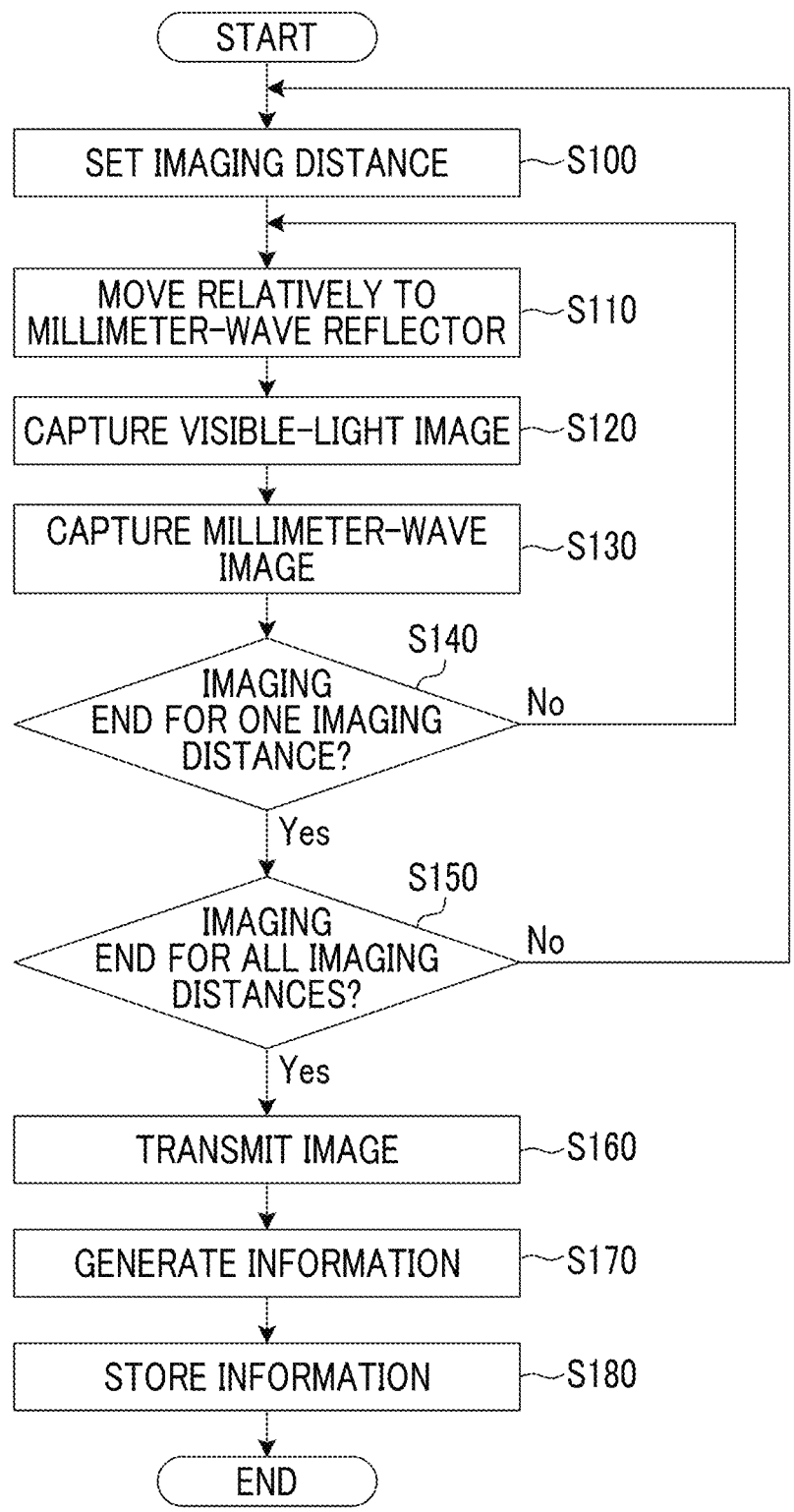
FIG. 4 is a flowchart showing processing of an information acquisition method.

FIG. 4 is a flowchart showing pieces of processing of the information acquisition method. These pieces of processing can be performed by the control device 100 (processor) controlling the drone 200 based on the information acquisition program recorded in the HDD 140.

First, the imaging distance is set (step S100). For example, the control device 100 flies the drone 200 and secures the set imaging distance with a metal plate (millimeter-wave reflector) installed on a concrete structure. In a case where the imaging distance is set, the distance measurement unit 110B can measure the imaging distance based on the data of the LiDAR sensor 250. The millimeter-wave reflector may be installed in a vertical direction or may be installed in a horizontal plane.

The control device 100 relatively moves the millimeter-wave reflector and the drone 200 while constantly maintaining the imaging distance set in step S100 (step S110: visible-light image capturing step, millimeter-wave image capturing step). For example, in a situation of (a), (b), and (c) of FIG. 9 described below, the relative movement is performed within an XZ plane. In the case of the relative movement, the drone 200 may move (fly), or the millimeter-wave reflector may be moved by another vehicle, drone, or the like.

Figure 5A:
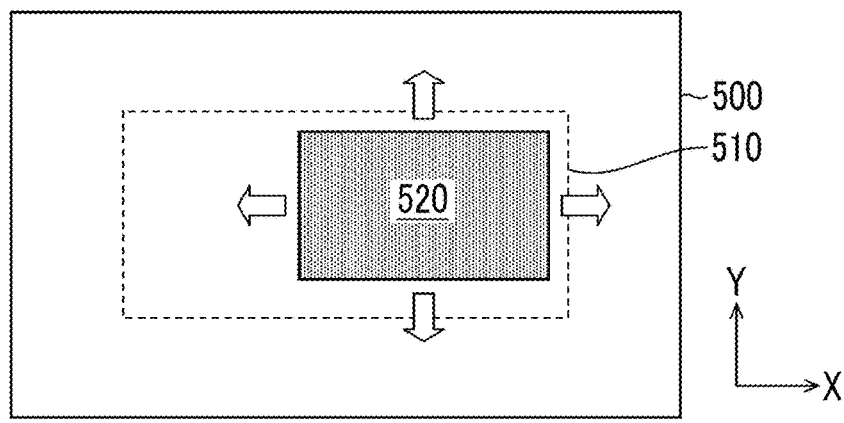
FIGS. 5A, 5B, and 5C are diagrams showing a state of relative movement of a millimeter-wave reflector.
Figure 5B:
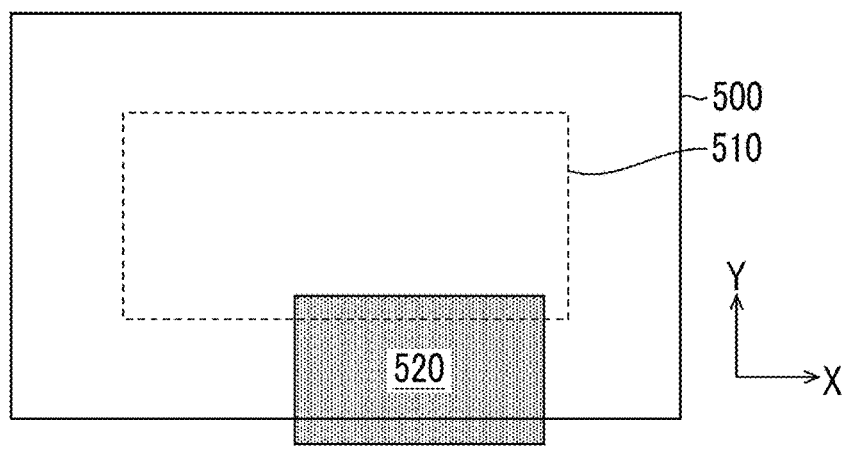
Figure 5C:
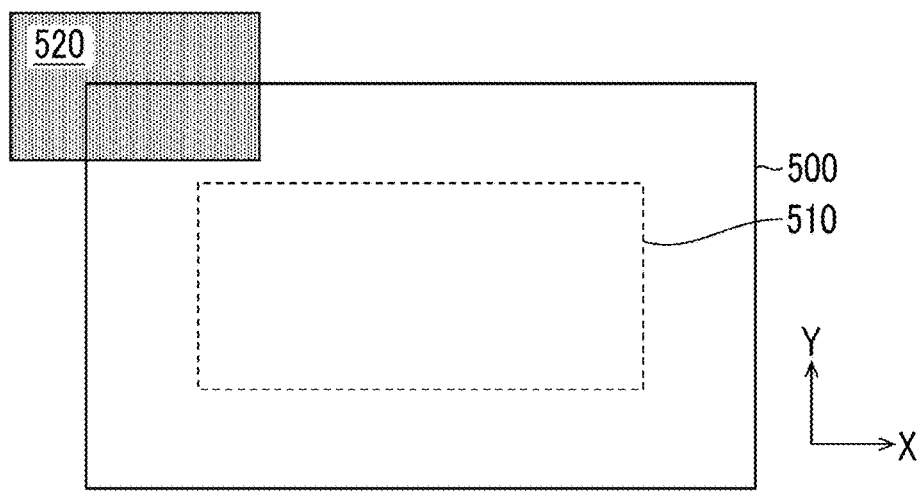

FIGS. 5A, 5B, and 5C are diagrams showing a state of the relative movement of the millimeter-wave reflector. FIG. 5A shows a state where the entire millimeter-wave reflector 520 is within imaging ranges of a visible-light image 500 and a millimeter-wave image 510. FIG. 5B shows a state where a part of the millimeter-wave reflector 520 is out of the imaging ranges of the visible-light image 500 and the millimeter-wave image 510. FIG. 5C shows a state where the millimeter-wave reflector 520 is completely out of the imaging range of the millimeter-wave image 510. With such relative movement, it is possible to specify a point (end point of millimeter-wave image 510) at which the millimeter-wave radar 240 cannot detect radar reflection intensity of the millimeter-wave reflector 520. It is preferable to perform the relative movement little by little in a wide range.

The control device 100 captures the visible-light image and the millimeter-wave image using the visible-light camera 230 and the millimeter-wave radar 240 (step S120: visible-light image capturing step, step S130: millimeter-wave image capturing step). It is preferable to acquire a plurality of visible-light images and a plurality of millimeter-wave images for one imaging distance.

The control device 100 repeats the processing from step S110 to step S130 until images necessary for generating information in correspondence with one imaging distance are acquired (until YES in step S140) (visible-light image capturing step, millimeter-wave image capturing step). Further, the control device 100 repeats the processing from step S100 to step S140 for all determined imaging distances (a plurality of imaging distances) (step S150: visible-light image capturing step, millimeter-wave image capturing step).

After the imaging for the plurality of imaging distances ends, the acquired images are transmitted from the drone 200 to the control device 100 (step S160: visible-light image capturing step, millimeter-wave image capturing step). Then, based on the visible-light image and the millimeter-wave image, the control device 100 (image processing unit 110C; processor) generates the information (end point information) indicating the end points and/or edges of the millimeter-wave image in the visible-light image for each of the plurality of imaging distances (step S170: information generation step) and stores the information in the HDD 140 (step S180: information storing step). The information stored in the HDD 140 is referred to in the processing of the imaging method according to the present invention, as will be described below in detail. In the flowchart in FIG. 4, the imaging for all determined imaging distances ends and then the images are transmitted to generate the information, but the image transmission and the information generation may be performed each time the imaging for one imaging distance ends.

Figures 6, 7:
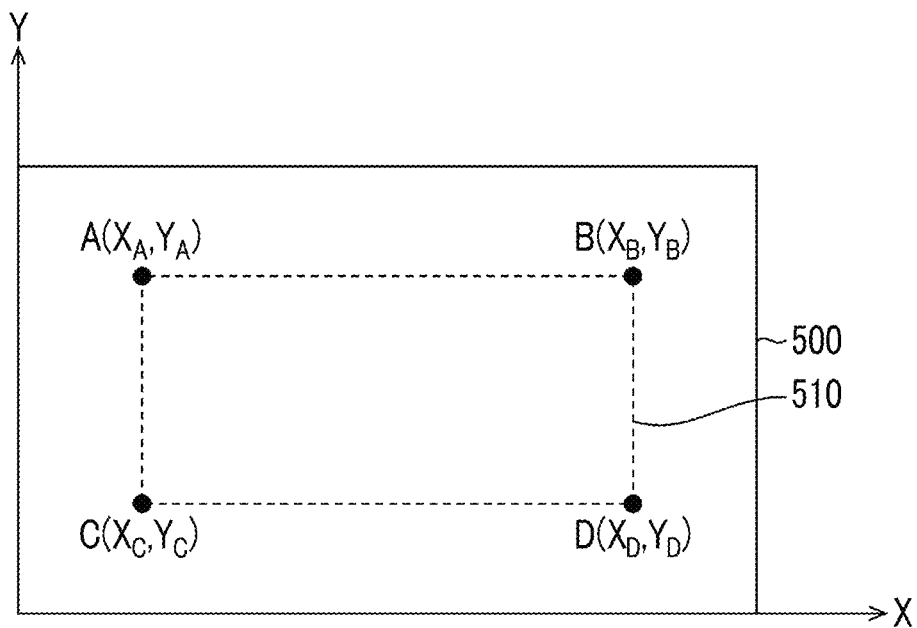
FIG. 6 is a diagram showing coordinates of end points of a millimeter-wave image in a visible-light image.
FIG. 7 is a table showing a relationship between imaging distances and the coordinates of the end points.

FIG. 6 is a diagram showing coordinates (an example of the above "information"; end point information) of end points (end point A to end point D) of the millimeter-wave image 510 in the visible-light image 500. The end points A to D are points at which the millimeter-wave radar 240 cannot detect the radar reflection intensity of the millimeter-wave reflector. FIG. 7 is an example of a table showing a relationship between the imaging distances and the coordinates of the end points, and the coordinates of the four end points are held for the plurality of imaging distances. Such a table may be stored in the HDD 140 as it is, or coefficients (which can be derived from a plurality of coordinates by the method of least squares, for example) of an equation indicating a relationship between the imaging distance and X and Y coordinates of each end point may be stored. The edges of the millimeter-wave image 510 can be obtained from the coordinates of the end points. The display control unit 110D (processor) can display the end point information on the monitor 150 (display device) in a visual aspect as shown in FIG. 6 or in a table format as shown in FIG. 7.

[Relationship Between Type of Object to be Inspected and Millimeter-Wave Reflectance of Millimeter-Wave Reflector]

In the information acquisition method according to the present invention, the above information may be generated using a millimeter-wave reflector having a millimeter-wave reflectance according to "millimeter-wave reflectance of object assumed to be imaged (inspected)", and the generated information may be stored in the HDD 140 or the like (memory) in association with not only the imaging distance but also a type of the object and/or the millimeter-wave reflectance. Specifically, in a case where the concrete structure with low millimeter-wave reflectance, such as a bridge, is inspected, it is preferable to perform the imaging using a material with high millimeter-wave reflectance (for example, metal plate such as aluminum) as the millimeter-wave reflector. On the contrary, in a case where a metal structure with high millimeter-wave reflectance, such as metal tank or pipeline, is inspected, it is preferable to perform the imaging using a material with low millimeter-wave reflectance (for example, wood, paper, cloth, or radio wave absorber) as the millimeter-wave reflector. In other words, it is preferable that the millimeter-wave reflector and the object to be inspected differ greatly in the millimeter-wave reflectance, and it is preferable to generate the information by selecting such a millimeter-wave reflector in accordance with the type of the object. The information generated in this manner can be stored in the HDD 140 (memory) or the like in association with the type of the object to be inspected and the millimeter-wave reflectance.

[Processing of Imaging Method]

Figure 8:
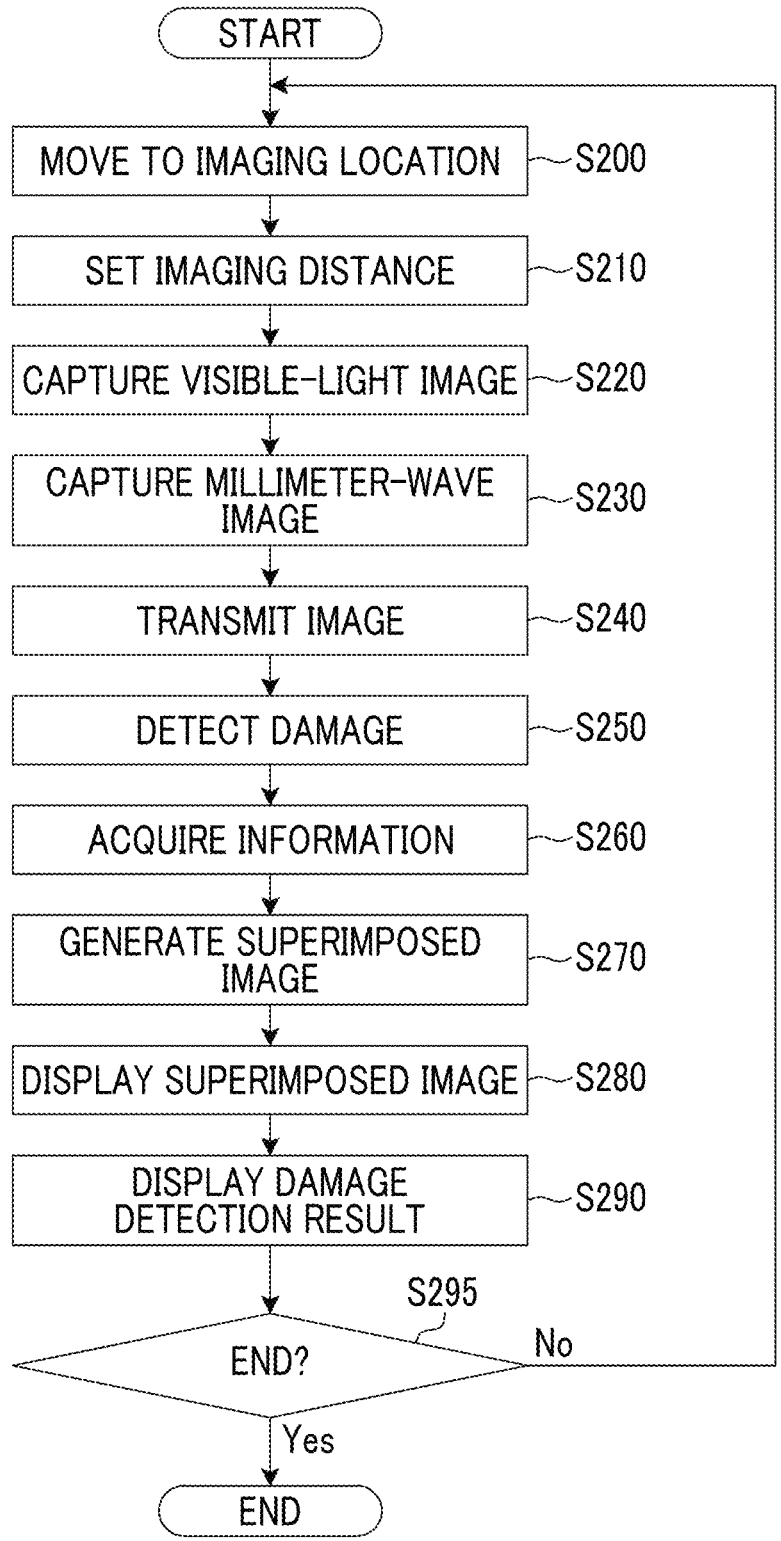
FIG. 8 is a flowchart showing processing of an imaging method.
(a), (b), and (c) of FIG. 9 are diagrams showing a state of sensing a surface and inside of an object.
Figure 9:
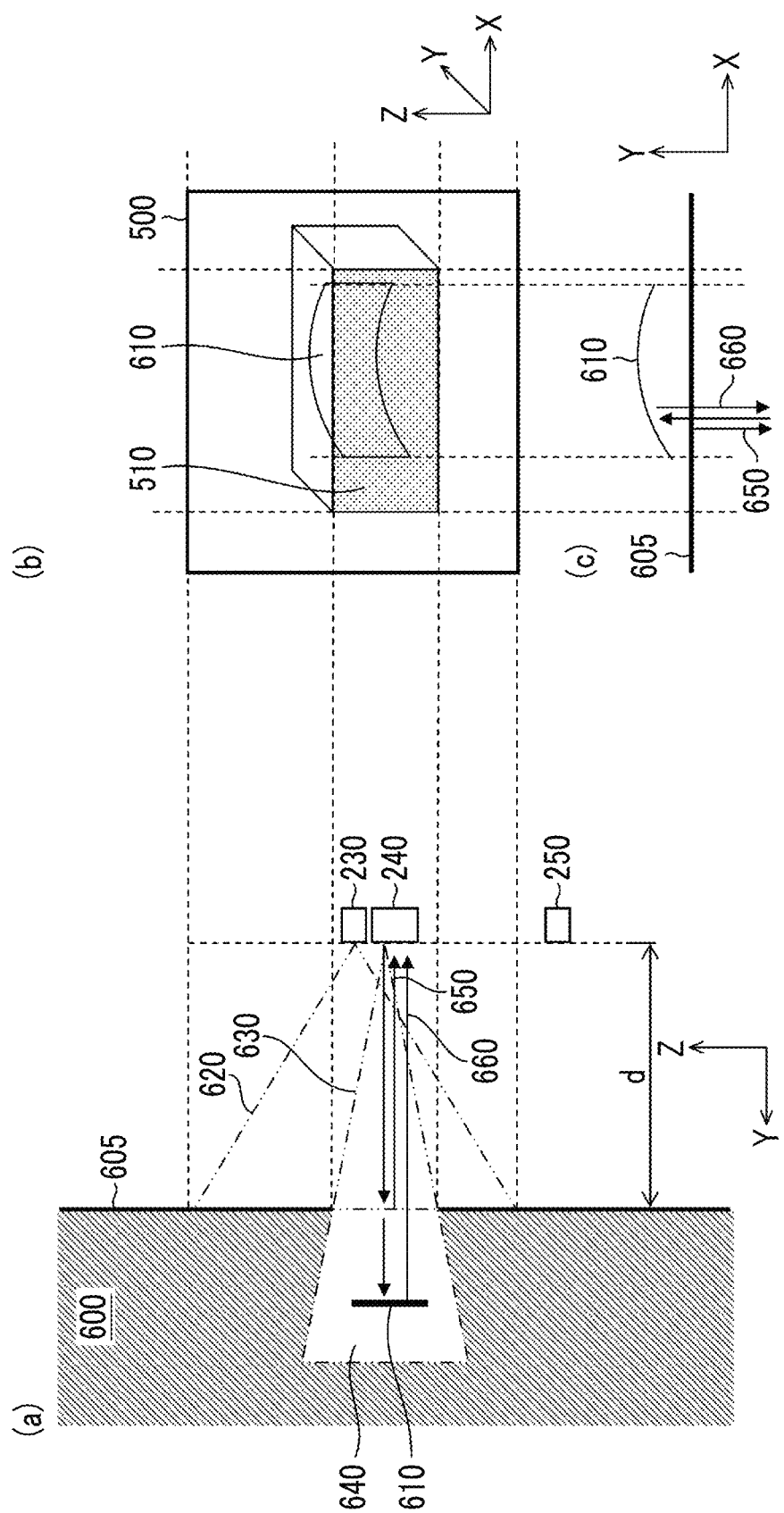

FIG. 8 is a flowchart showing the processing of the imaging method according to the present invention, and (a), (b), and (c) of FIG. 9 are diagrams showing a state of sensing the surface and inside of the object. (a), (b), and (c) of FIG. 9 show an example in which a wall surface 605 of a concrete structure 600 (target object, concrete structure, social infrastructure structure) existing in the vertical direction is imaged, where the vertical direction is +Z, a horizontal direction (right side facing wall surface) is +X, and a depth direction is +Y.

[Image Capturing and Acquisition of Distance Data]

The control device 100 controls the drone 200 to move to an imaging location (step S200), measures the imaging distance based on the information of the LiDAR sensor 250 (step S210: imaging distance measurement step), and then captures the visible-light image and the millimeter-wave image using the visible-light camera 230 and the millimeter-wave radar 240 (steps S220 to S230: visible-light image capturing step, millimeter-wave image capturing step).

[Surface and Inside Sensing]

As shown in part (a) of FIG. 9, the visible-light image and the millimeter-wave image have angles of view 620 and 630, respectively (where d is imaging distance). Further, an internal defect 610 (crack, float, or the like) exists in a millimeter-wave internal sensing region 640. Part (b) of FIG. 9 is a front perspective view of the imaging range and shows a state where the imaging range of the millimeter-wave image 510 exists within the imaging range of the visible-light image 500 and the internal defect 610 is imaged. Part (c) of FIG. 9 shows a reflected wave 650 of the millimeter wave reflected by the wall surface 605 and a reflected wave 660 of the millimeter wave reflected by the internal defect 610. With the millimeter-wave radar 240, the reflection intensity (depth information) of the reflected waves 650 and 660 can be acquired for each millimeter-wave pixel.

Figure 10:
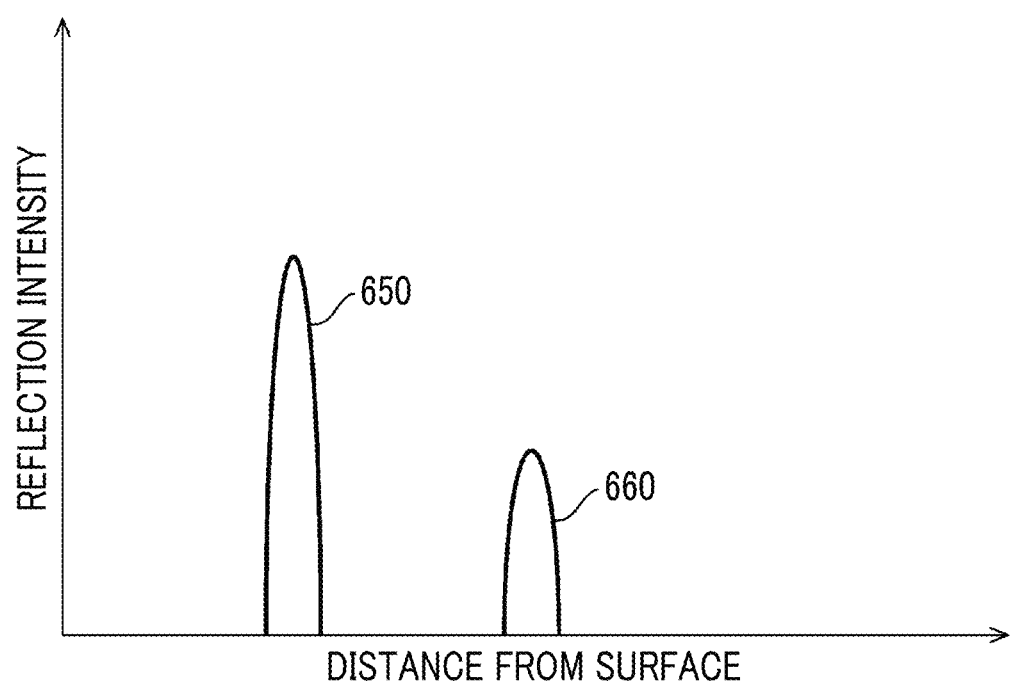
FIG. 10 is a graph showing surface reflection and internal reflection of a millimeter wave.

FIG. 10 is a graph showing surface reflection and internal reflection of the millimeter wave. As shown in the figure, the reflection intensity of the reflected wave 650 on the surface is generally higher than the reflection intensity of the reflected wave 660 from the inside. Further, the reflected wave 660 is shorter than the reflected wave 650 in a time until the reflected wave is obtained from the emission of the millimeter wave. In the imaging system 10, it is possible to acquire the depth information of the internal defect 610 using such properties and to generate the millimeter-wave image using only one of the reflected waves 650 and 660 and the millimeter-wave image using both of the reflected waves.

After the image and the data are acquired, the drone 200 transmits the acquired image to the control device 100 by wireless communication (step S240).

[Damage Detection and Calculation of Imaging Distance]

Based on the received image and data, the image processing unit 110C (processor) of the control device 100 detects the damage (step S250: damage detection step).

[Acquisition of End Point Information]

The image processing unit 110C (processor) refers to the HDD 140 (memory) based on the calculated imaging distance to acquire the information (end point information) indicating the end points and/or edges of the millimeter-wave image in the visible-light image (step S260: information acquisition step). The image processing unit 110C acquires the coordinates of the end point in correspondence with the imaging distance in a case where the calculated imaging distance matches one of the imaging distances in the table of end point information (FIG. 7), and interpolates or extrapolates the stored end point information to acquire the end point information in correspondence with the imaging distance in a case where the calculated imaging distance does not match one of the imaging distances. For example, the image processing unit 110C can acquire coordinates $(X1_A, Y1_A)$ to $(X1_D, Y1_D)$ in a case where the calculated imaging distance is d1, interpolate the end point information of d2 and d3 to acquire the coordinates in a case where the imaging distance is between d2 and d3, and extrapolate the end point information of d1 and d2 to acquire the coordinates in a case where the imaging distance is shorter than d1.

[Generation and Display of Superimposed Image]

The image processing unit 110C (processor) superimposes the visible-light image and the millimeter-wave image based on the acquired information (end point information) to generate the superimposed image (step S270: image generation step). The display control unit 110D (processor) causes the monitor 150 (display device) to display the generated superimposed image (step S280: image display step). The display control unit 110D may individually display the visible-light image and the millimeter-wave image according to the user instruction or the like via the operation unit 160.

Figure 11A:
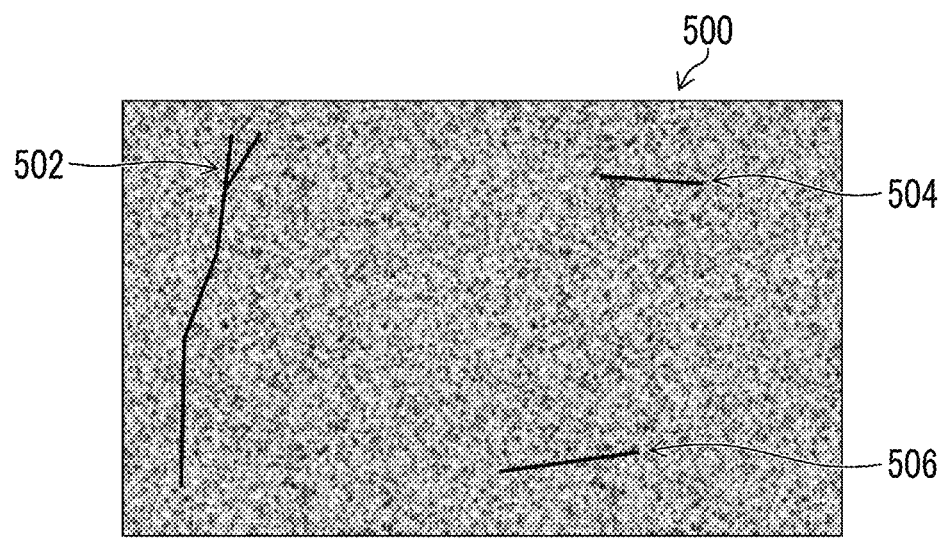
FIGS. 11A, 11B, and 11C are diagrams showing examples of a visible-light image, a millimeter-wave image, and a superimposed image.
Figure 11B:
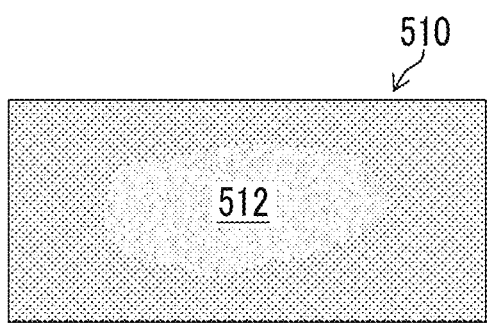
Figure 11C:
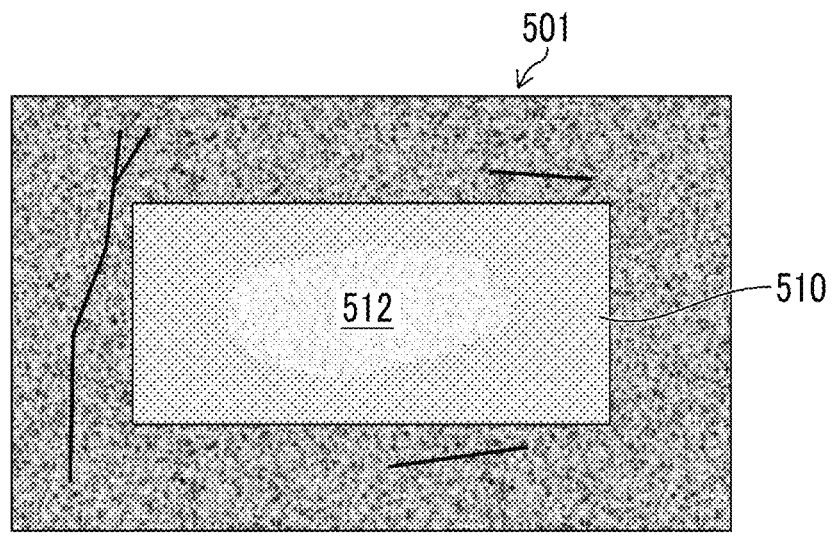

FIGS. 11A, 11B, and 11C are diagrams showing examples of a visible-light image, a millimeter-wave image, and a superimposed image. FIG. 11A is an example of the visible-light image (visible-light image 500), in which cracks 502, 504, and 506 (damages generated on structure surface) appear in the image. FIG. 11B is an example of the millimeter-wave image (millimeter-wave image 510), in which an internal defect 512 (crack) appears in the image. FIG. 11C is an example of a superimposed image 501 in which the visible-light image 500 and the millimeter-wave image 510 are superimposed.

The image processing unit 110C can superimpose the millimeter-wave image based on the surface reflection and/or the internal reflection (refer to FIGS. 9 and 10) on the visible-light image. In a case where resolutions of the visible-light image and the millimeter-wave image are different, the image processing unit 110C can interpolate pixels in the visible-light image and/or the millimeter-wave image to match the resolutions in a pseudo manner for the generation of the superimposed image.

Figure 12:
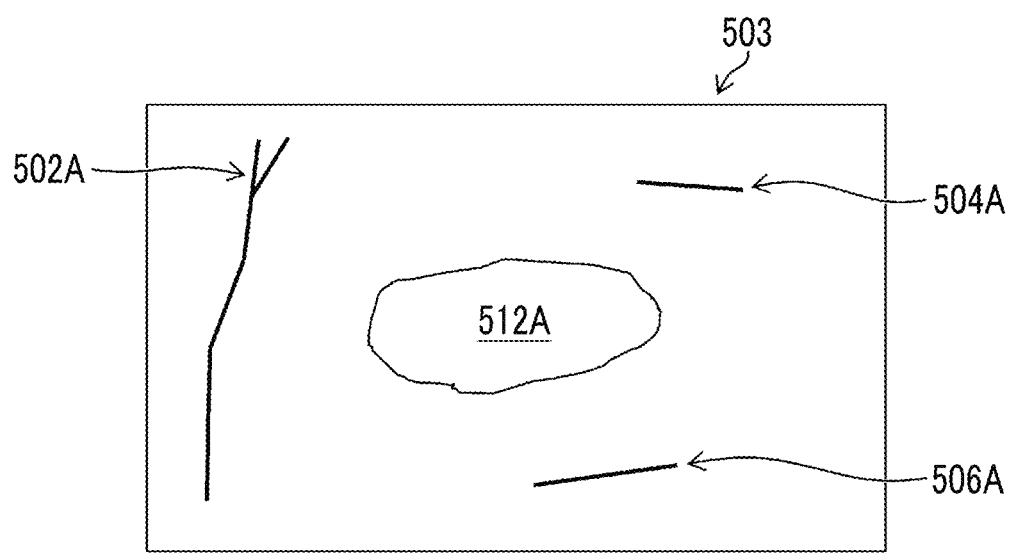
FIG. 12 is a diagram showing a composite image of damage vectors.

The display control unit 110D can cause the monitor 150 to display the damage (surface and/or internal) detection results (step S290). Also, the damage may be displayed as a vector or a group of vectors. FIG. 12 is a diagram showing a composite image of damage vectors (composite image 503), in which vectorized cracks 502A, 504A, 506A, and 512A appear in the composite image 503.

The control device 100 repeats the above processing until the processing for the determined imaging range ends (until YES in step S295).

Effects of First Embodiment

As described above, with the imaging system 10, the information acquisition method, and the imaging method according to the first embodiment, the information indicating the end points and/or edges of the millimeter-wave image in the visible-light image is acquired, and the superimposed image in which the visible-light image and the millimeter-wave image are superimposed based on this information is generated. Therefore, even in a case where the angle of view differs between the visible-light image and the millimeter-wave image or in a case where an imaging direction differs due to an assembly error or the like and the imaging range shifts as a result, it is possible to superimpose the images with the information acquisition method and imaging method of the present invention and to observe the same region at different wavelengths.

In the first embodiment, the moving object is the drone 200 (flying object), but the moving object may be a vehicle or a movable robot in the imaging system of the present invention. Further, a millimeter-wave radar such as the millimeter-wave radar 240 or a laser triangulation device may be used for distance measurement. A stereo image may be acquired by using two visible-light cameras, and the distance may be measured by using this stereo image.

Orientations (imaging directions, distance measurement directions) of the visible-light camera 230, the millimeter-wave radar 240, and the LiDAR sensor may be lateral, vertically upward, vertically downward, or oblique. The imaging direction or the distance measurement direction may be changed.

Second Embodiment

[Configuration of Imaging System]

Figure 13:
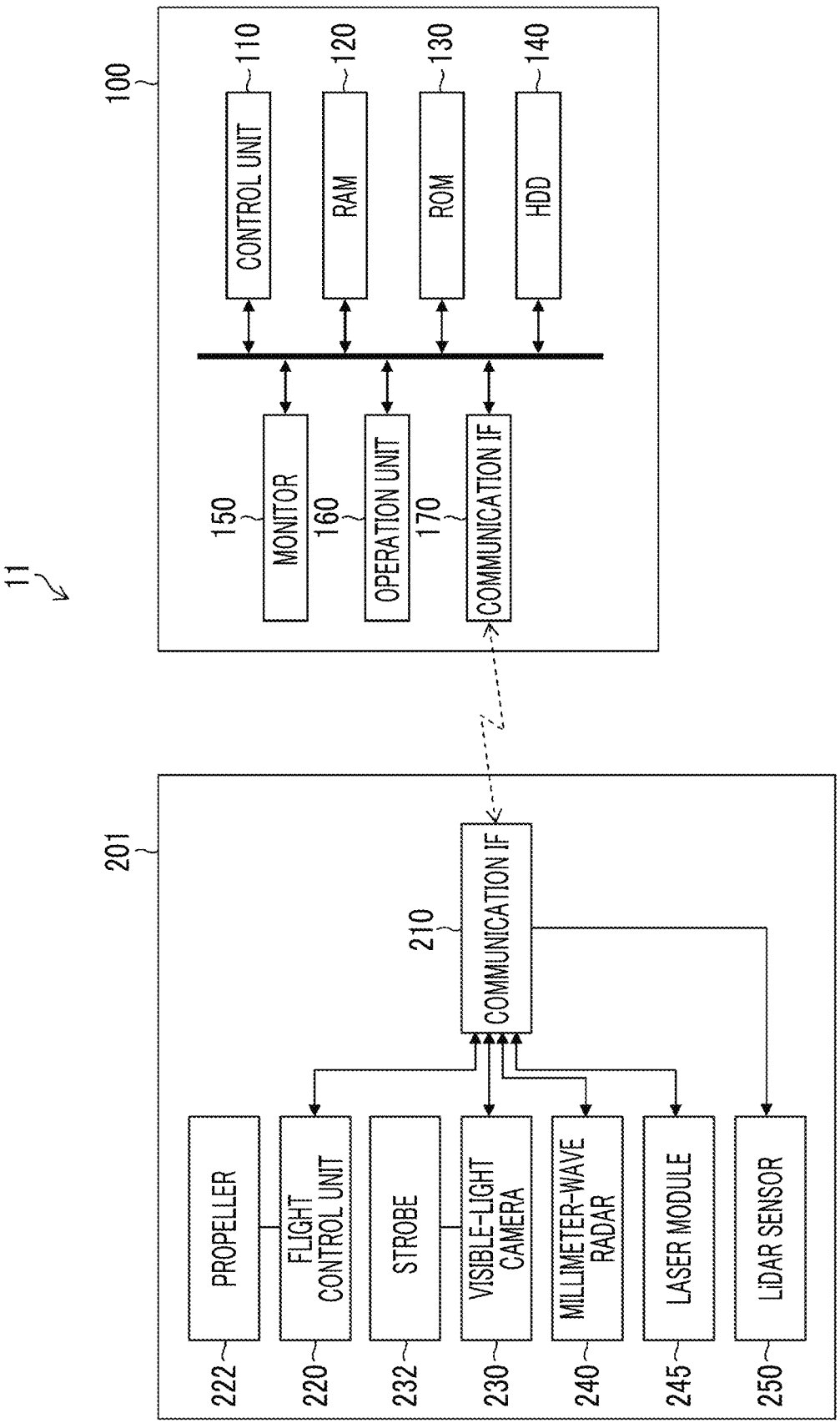
FIG. 13 is a diagram showing a schematic configuration of an imaging system according to a second embodiment.

FIG. 13 is a diagram showing a schematic configuration of an imaging system 11 according to a second embodiment. In the imaging system 11, a drone 201 comprises a laser module 245 (laser head) that emits laser light indicating end points and/or edges of a millimeter-wave image in a visible-light image. Since other configurations are the same as those of the imaging system 10 according to the first embodiment, detailed description thereof will be omitted.

Figure 14A:
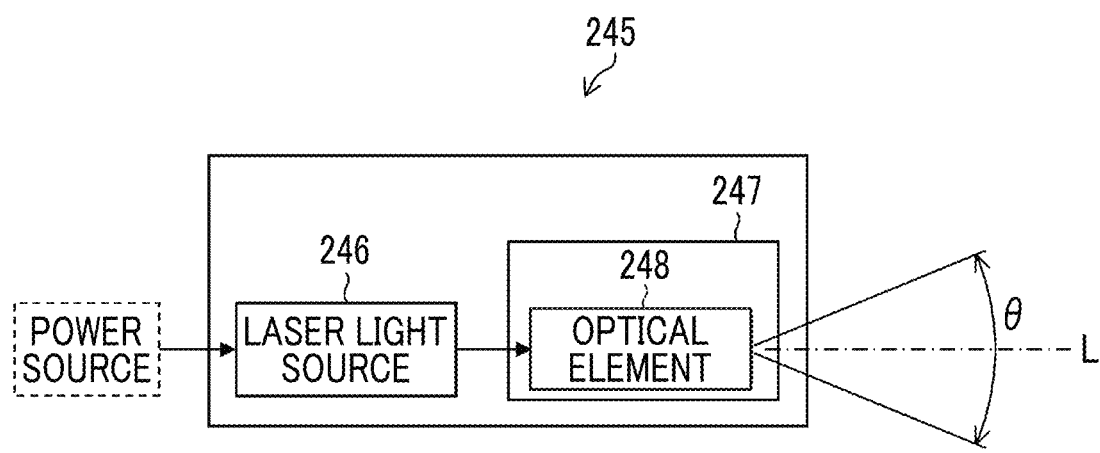
FIGS. 14A and 14B are diagrams showing configurations of a laser module.
Figure 14B:
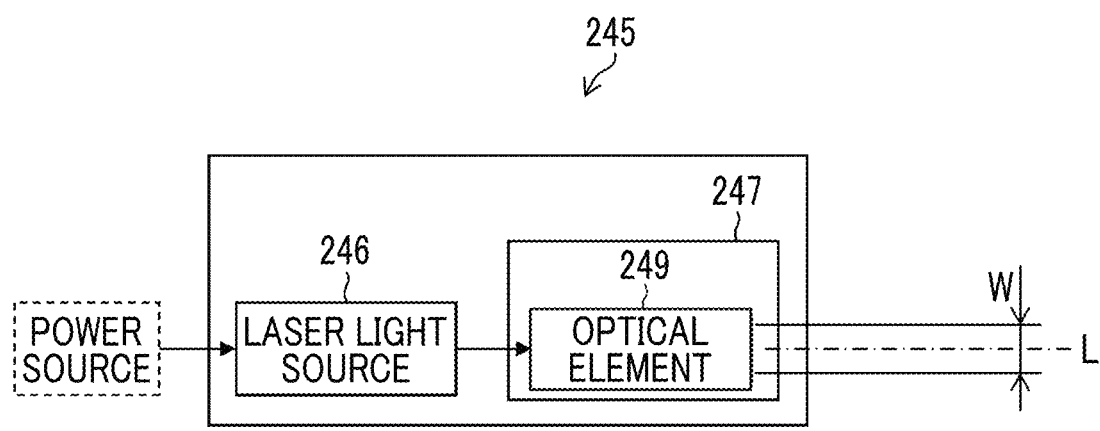

FIGS. 14A and 14B are diagrams showing configurations of the laser module 245. The laser module 245 comprises a laser light source 246 that generates the laser light and a laser head 247 (laser head). The laser head 247 comprises an optical element 248 that emits the laser light as pattern light having a determined pattern. In the example shown in FIG. 14A, linear pattern light (optical axis L) with a spread of beam angle θ is emitted. In the example shown in FIG. 14B, the laser module 245 comprises an optical element 249 and linear pattern light (optical axis L) with a beam width W is emitted.

As the optical elements 248 and 249, for example, a laser line generator, a rod lens, a cylindrical lens, and a diffraction grating can be used. An output of the laser light can be 0.39 mW or more and 1.0 mW or less (class 2 of JIS C 6802).

[Laser Light Pattern]

Figure 15A:
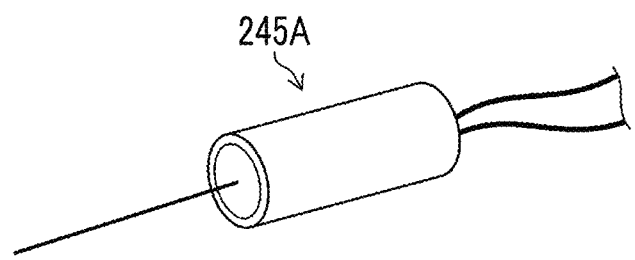
FIGS. 15A, 15B, and 15C are diagrams showing emission patterns of laser light.
Figure 15B:
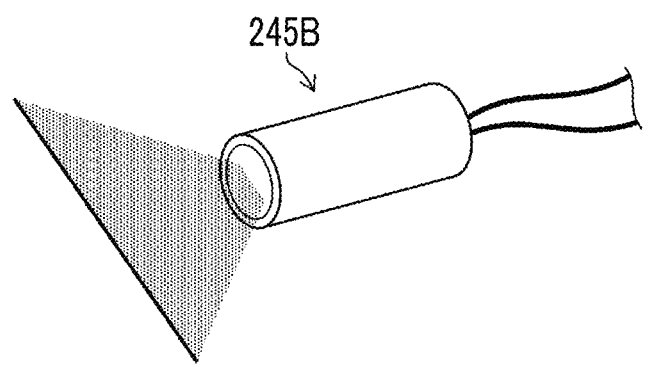
Figure 15C:
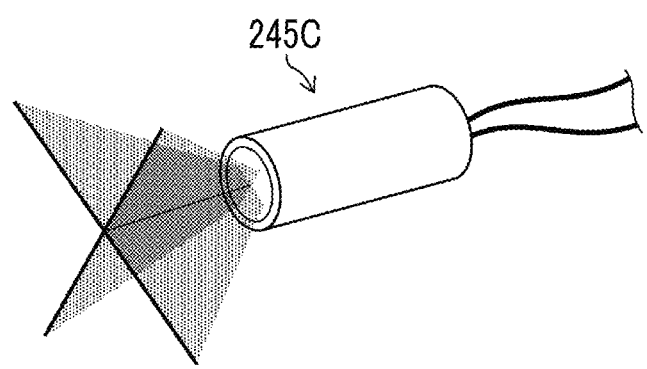

FIGS. 15A, 15B, and 15C are diagrams showing emission patterns of the laser light. FIG. 15A shows a laser module 245A that emits a spot laser light, FIG. 15B shows a laser module 245B that emits a line laser light, and FIG. 15C shows a laser module 245C that emits laser light in which a plurality of lines cross each other.

[Display Example of End Point and Edge]

Figure 16A:
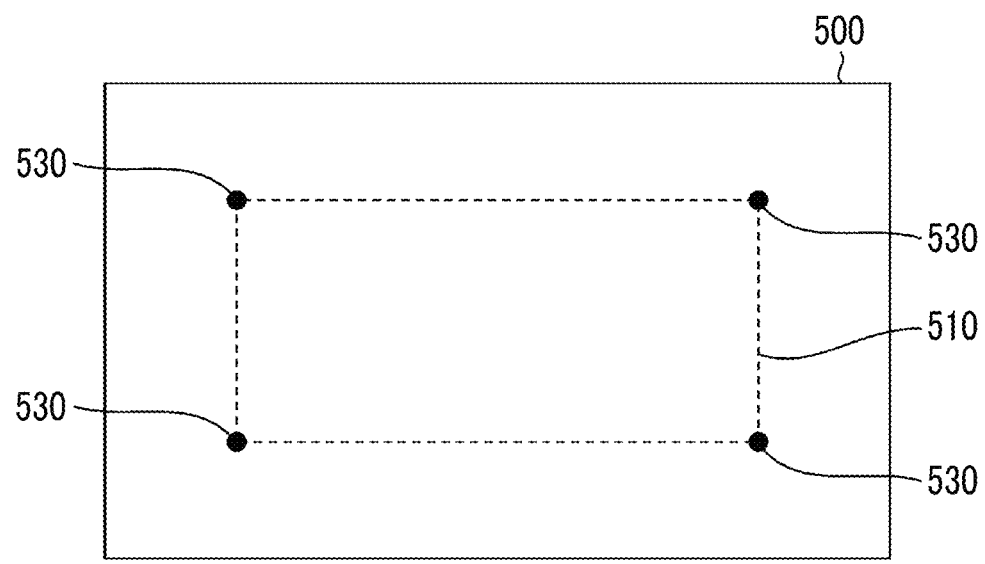
FIGS. 16A and 16B are diagrams showing an image of a state where laser light is emitted.
(a), (b), and (c) of FIG. 17 are diagrams showing a state of sensing the surface and inside of the object.
Figure 16B:
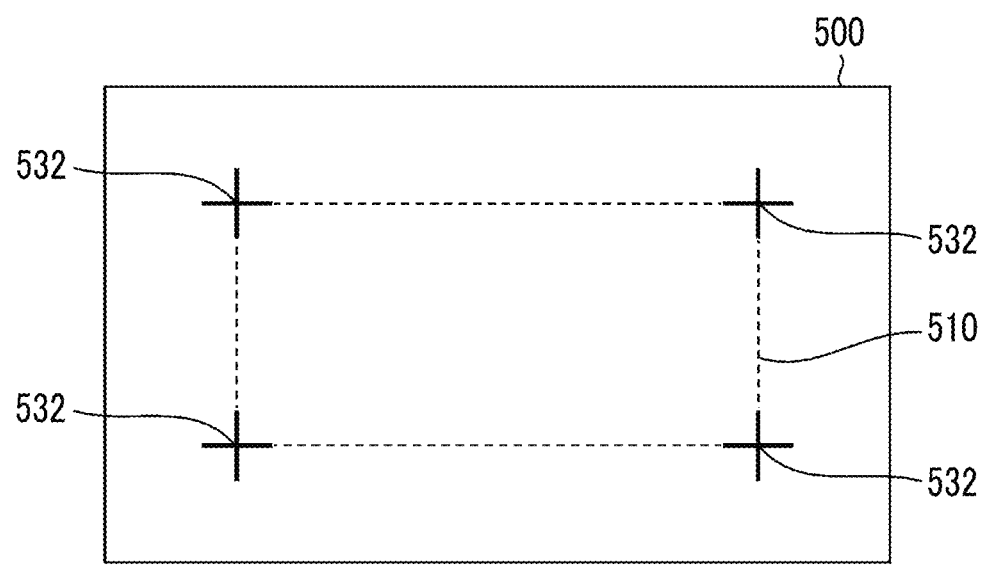
Figure 17:
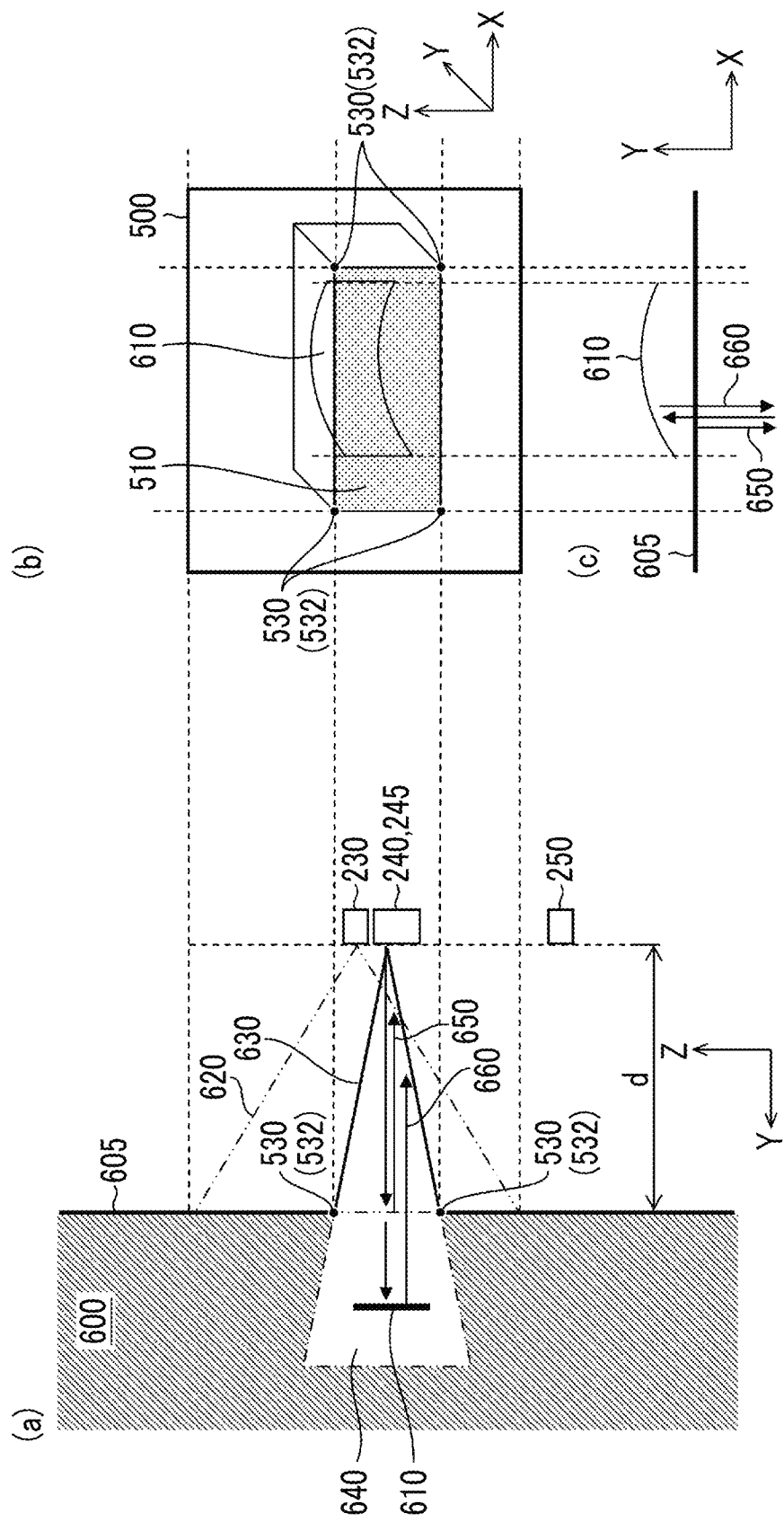

The drone control unit 110E and the communication control unit 110F (processor) can cause the laser module 245 (laser head 247) to emit the laser light indicating the end points and/or edges of the millimeter-wave image, based on the information (refer to FIG. 7, etc.) stored in the HDD 140 (memory). FIGS. 16A and 16B are diagrams showing an image of a state where the laser light is emitted. FIG. 16A shows a state where a spot pattern 530 indicating the end point of the millimeter-wave image 510 is emitted. FIG. 16B shows a state where a cross-line pattern 532 indicating the edge (corner portion) of the millimeter-wave image 510 is emitted. The emission pattern can be a spot, a line, or a combination thereof (refer to FIG. 15). (a), (b), and (c) of FIG. 17 are diagrams showing a state of sensing the surface and inside of the object (similar to FIG. 9 in first embodiment) and showing a state where the patterns 530 and 532 indicating the edges (corner portions) of the millimeter-wave image 510 are emitted.

In the imaging system 11 according to the second embodiment, such laser light may be emitted to some end points and/or edges. For example, the laser light can be emitted to two end points on a diagonal line among the four end points.

[Focus Control Using Laser Light]

Bridges such as the above-mentioned bridge 20 and social infrastructure structures such as tunnels often have objects to be observed in dark locations. In such cases, accurate focus control may become difficult during the imaging (of visible-light image). To address such a problem, the imaging system 11 can also use the laser light as focus assist light for indicating the end points and/or edges of the millimeter-wave image.

Specifically, the image acquisition unit 110A and the drone control unit 110E (processor) cause the laser module 245 (laser head 247) to emit the laser light to the object (floorboard 22, bridge pier 24, or the like). The visible-light camera 230 (visible-light image capturing device) performs the focus control on the object to which the laser light is emitted to capture the visible-light image. The image acquisition unit 110A and the drone control unit 110E may stop the emission of the laser light during the imaging (during exposure period of the imaging element), and can cause the strobe 232 to emit light as necessary.

With the imaging system 11, by using the laser light as the focus assist light in this manner, it is possible to acquire an image in which the object is focused with high precision.

In a case where the laser light is used as the focus assist light, it is preferable that the laser light has a wavelength band that at least partially overlaps with a transmission wavelength band of optical filters arranged in the pixels for focus control of the imaging element of the visible-light camera 230. For example, in a case where the pixels for focus control are G pixels (pixels arranged with green color filters), green laser light (with wavelength band that at least partially overlaps with wavelength band of 495 nm to 570 nm) is preferred. Further, in a case where the laser light is used as the focus assist light, it is preferable that the emission pattern is a pattern according to an arrangement direction of the pixels for focus control arranged in the imaging element. For example, in a case where the pixels for focus control are arranged in the horizontal direction of the imaging element (or main body of the imaging apparatus), it is preferable that the emission pattern is a pattern extending in the vertical direction (direction orthogonal to arrangement direction). For example, since the pattern 532 illustrated in FIG. 16B is configured of a plurality of orthogonal lines, the pattern 532 has a component that is orthogonal to the arrangement direction regardless of a direction in which the pixels for focus control are arranged. Therefore, the visible-light camera 230 can recognize the pattern 532 and perform highly accurate focus control.

Imaging and Like in Second Embodiment

As in the imaging system 10 according to the first embodiment, in the imaging system 11 configured as described above, it is possible to execute the information acquisition method and imaging method of the present invention to acquire the end point information, image the object, create the superimposed image, detect the damage, and the like. Accordingly, even in a case where the angle of view differs between the visible-light image and the millimeter-wave image or in a case where the imaging direction differs due to the assembly error or the like and the imaging range shifts as a result, it is possible to superimpose the images with the information acquisition method and imaging method of the present invention and to observe the same region at different wavelengths.

Although the embodiments of the present invention have been described above, the present invention is not limited to the above aspects, and various modifications can be made without departing from the spirit of the present invention.

EXPLANATION OF REFERENCES

10: imaging system
11: imaging system
20: bridge
22: floorboard
24: pier
100: control device
110: control unit
110A: image acquisition unit
110B: distance measurement unit
110C: image processing unit
110D: display control unit
110E: drone control unit
110F: communication control unit
120: RAM
130: ROM
140: HDD
150: monitor
160: operation unit
170: communication IF
200: drone
201: drone
210: communication IF
220: flight control unit
222: propeller
230: visible-light camera
232: strobe
240: millimeter-wave radar
245: laser module
245A: laser module
245B: laser module
245C: laser module
246: laser light source
247: laser head
248: optical element
249: optical element
250: LiDAR sensor
500: visible-light image
501: superimposed image
502: crack
502A: crack
503: composite image
504: crack
504A: crack
506: crack
506A: crack
510: millimeter-wave image
512: internal defect
520: millimeter-wave reflector
530: pattern
532: pattern
600: concrete structure
605: wall surface
610: internal defect
620: angle of view
630: angle of view
640: millimeter-wave internal sensing region
650: reflected wave
660: reflected wave
A: end point
D: end point
L: optical axis
W: beam width
θ: beam angle
S100 to S195: each step of the information acquisition method
S200 to S290: each step of imaging method

What is claimed is:

1. An imaging system comprising:
a visible-light image capturing device that images an object with light including visible light to acquire a visible-light image;

a millimeter-wave image capturing device that images the object with an electromagnetic wave in a millimeter-wave band to acquire a millimeter-wave image;
a distance measurement device that measures an imaging distance to the object;
a memory in which information indicating end points and/or edges of the millimeter-wave image in the visible-light image is stored in correspondence with the imaging distance;
a laser head that emits laser light to the object; and
a processor configured to:
  acquire the information in correspondence with the imaging distance by referring to the memory;
  cause the laser head to emit laser light indicating the end points and/or edges based on the acquired information, to the object; and
  generate a superimposed image in which the visible-light image and the millimeter-wave image are superimposed based on the acquired information, wherein
the visible-light image capturing device performs focus control on the object to which the laser light is emitted to capture the visible-light image,
the laser light has a wavelength band that at least partially overlaps with a transmission wavelength band of optical filters arranged in pixels for focus control of an imaging element of the visible-light image capturing device, and
an emission pattern of the laser light is a pattern according to an arrangement direction of the pixels for focus control arranged in the imaging element.

2. The imaging system according to claim 1,
wherein the processor causes a display device to display the superimposed image.

3. The imaging system according to claim 2,
wherein the processor causes the display device to display the information.

4. The imaging system according to claim 1,
wherein the processor interpolates or extrapolates the information stored in the memory to acquire the information in correspondence with the imaging distance.

5. The imaging system according to claim 1,
wherein the distance measurement device is a millimeter-wave radar, a laser distance measurement device, or a laser triangulation device.

6. The imaging system according to claim 1,
wherein the millimeter-wave image capturing device senses an inside of the object.

7. The imaging system according to claim 6,
wherein the millimeter-wave image capturing device senses a damage existing inside the object.

8. The imaging system according to claim 1,
wherein the visible-light image capturing device, the millimeter-wave image capturing device, and the distance measurement device are mounted on a moving object.

9. The imaging system according to claim 8,
wherein the moving object is a vehicle or a flying object.

10. The imaging system according to claim 1,
wherein the object is a social infrastructure structure.

11. An imaging method comprising:
a visible-light image capturing step of imaging an object with light including visible light to acquire a visible-light image;
a millimeter-wave image capturing step of imaging the object with an electromagnetic wave in a millimeter-wave band to acquire a millimeter-wave image;
a distance measurement step of measuring an imaging distance to the object;
an information acquiring step of referring to a memory in which information indicating end points and/or edges of the millimeter-wave image in the visible-light image is stored in correspondence with the imaging distance to acquire the information in correspondence with the imaging distance;
a laser light emission step of causing a laser head to emit laser light indicating the end points and/or edges based on the acquired information, to the object; and
an image generation step of generating a superimposed image in which the visible-light image and the millimeter-wave image are superimposed based on the acquired information, wherein
the visible-light image capturing is performed by focus control on the object to which the laser light is emitted to capture the visible-light image,
the laser light has a wavelength band that at least partially overlaps with a transmission wavelength band of optical filters arranged in pixels for focus control of an imaging element of a visible-light image capturing device, and
an emission pattern of the laser light is a pattern according to an arrangement direction of the pixels for focus control arranged in the imaging element.

12. A non-transitory, computer-readable tangible recording medium which records thereon, a program for causing, when read by a computer, the computer to perform the imaging method according to claim 11.

13. An information acquisition method that uses a visible-light image capturing device that images an object with light including visible light to acquire a visible-light image and a millimeter-wave image capturing device that images an object with an electromagnetic wave in a millimeter-wave band to acquire a millimeter-wave image, the information acquisition method comprising:
a visible-light image capturing step of imaging a millimeter-wave reflector as the object with the visible-light image capturing device to acquire the visible-light image for a plurality of imaging distances;
a millimeter-wave image capturing step of imaging the millimeter-wave reflector with the millimeter-wave image capturing device to acquire the millimeter-wave image for the plurality of imaging distances;
an information generation step of generating information indicating end points and/or edges of the millimeter-wave image in the visible-light image for each of the plurality of imaging distances, based on the visible-light image and the millimeter-wave image; and
an information storing step of storing the information in association with each of the plurality of imaging distances in a memory, wherein
the visible-light image capturing is performed by focus control on the object to which laser light is emitted to capture the visible-light image,
the laser light has a wavelength band that at least partially overlaps with a transmission wavelength band of optical filters arranged in pixels for focus control of an imaging element of the visible-light image capturing device, and
an emission pattern of the laser light is a pattern according to an arrangement direction of the pixels for focus control arranged in the imaging element.

14. The information acquisition method according to claim 13, wherein in the visible-light image capturing step and the millimeter-wave image capturing step, the visible-light image and the millimeter-wave image are acquired while relatively moving the visible-light image capturing device, the millimeter-wave image capturing device, and the millimeter-wave reflector in a state where the imaging distance is constantly maintained.

15. The information acquiring method according to claim 13,
wherein in the visible-light image capturing step and the millimeter-wave image capturing step, a millimeter-wave reflector having a millimeter-wave reflectance according to a millimeter-wave reflectance of an object to be imaged is used to acquire the visible-light image and the millimeter-wave image, in the information generation step, the information is generated in correspondence with the millimeter-wave reflectance of the millimeter-wave reflector, and in the information storing step, the information is stored in the memory in association with the imaging distance and the millimeter-wave reflectance.

\* \* \* \* \*